(12) United States Patent
Denbo et al.

(10) Patent No.: US 10,160,353 B2
(45) Date of Patent: Dec. 25, 2018

(54) BELT-GUIDE CLIP FOR A CHILD SEAT

(71) Applicant: Dorel Juvenile Group, Inc., Foxboro, MA (US)

(72) Inventors: Sean R. Denbo, Columbus, IN (US); Kyle M. Franke, Columbus, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 15/337,823

(22) Filed: Oct. 28, 2016

(65) Prior Publication Data

US 2017/0120783 A1 May 4, 2017

Related U.S. Application Data

(60) Provisional application No. 62/248,729, filed on Oct. 30, 2015.

(51) Int. Cl.
*B60N 2/28* (2006.01)

(52) U.S. Cl.
CPC ......... *B60N 2/2884* (2013.01); *B60N 2/2863* (2013.01)

(58) Field of Classification Search
CPC ....... B60N 2/28; B60N 2/2884; B60N 2/2863
See application file for complete search history.

(56) References Cited

U.S. PATENT DOCUMENTS

| | | | |
|---|---|---|---|
| 1,340,303 A | 5/1920 | Sterne | |
| 2,807,067 A | 9/1957 | Bayon | |
| 4,387,489 A | 6/1983 | Dudek | |
| 4,913,490 A * | 4/1990 | Takahashi | B60N 2/2821 297/130 |
| 6,048,028 A * | 4/2000 | Bapst | B60N 2/2812 24/169 |
| 6,152,528 A | 11/2000 | van Montfort | |
| 6,672,664 B2 | 1/2004 | Yanaka et al. | |
| 7,926,874 B2 | 4/2011 | Hendry | |
| 7,988,230 B2 | 8/2011 | Heisey et al. | |
| 9,150,126 B1 * | 10/2015 | Kitchens | B60N 2/2806 |
| 2005/0184567 A1 | 8/2005 | Carpenter et al. | |
| 2013/0300170 A1 | 11/2013 | Maciejczyk | |

\* cited by examiner

*Primary Examiner* — Philip F Gabler
(74) *Attorney, Agent, or Firm* — Barnes & Thornburg LLP

(57) ABSTRACT

According to the present disclosure, a juvenile vehicle seat is adapted to be installed on a vehicle passenger seat of a vehicle. Safety belt straps included in the vehicle are used to retain the juvenile vehicle seat in place on the vehicle passenger seat.

28 Claims, 8 Drawing Sheets

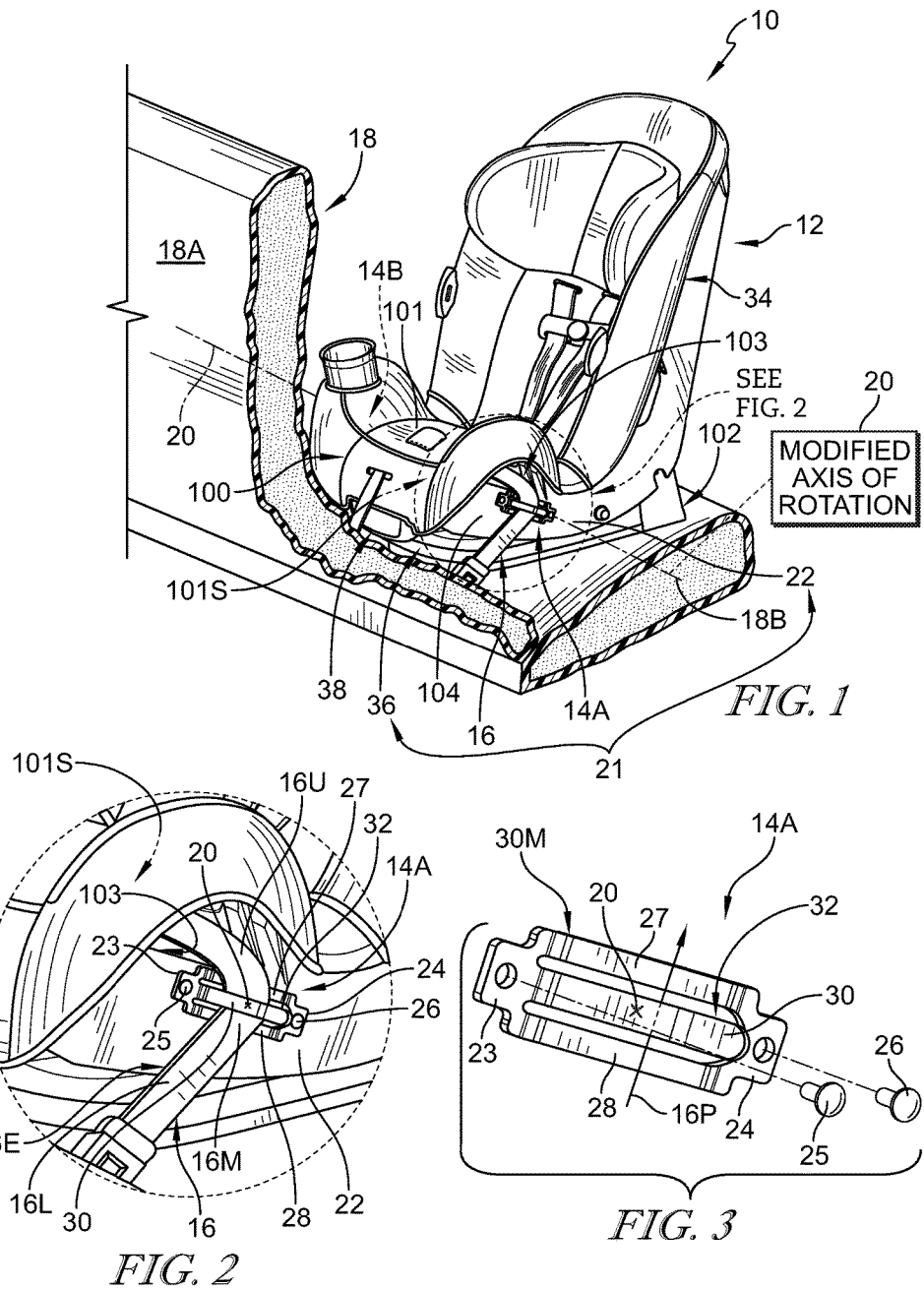

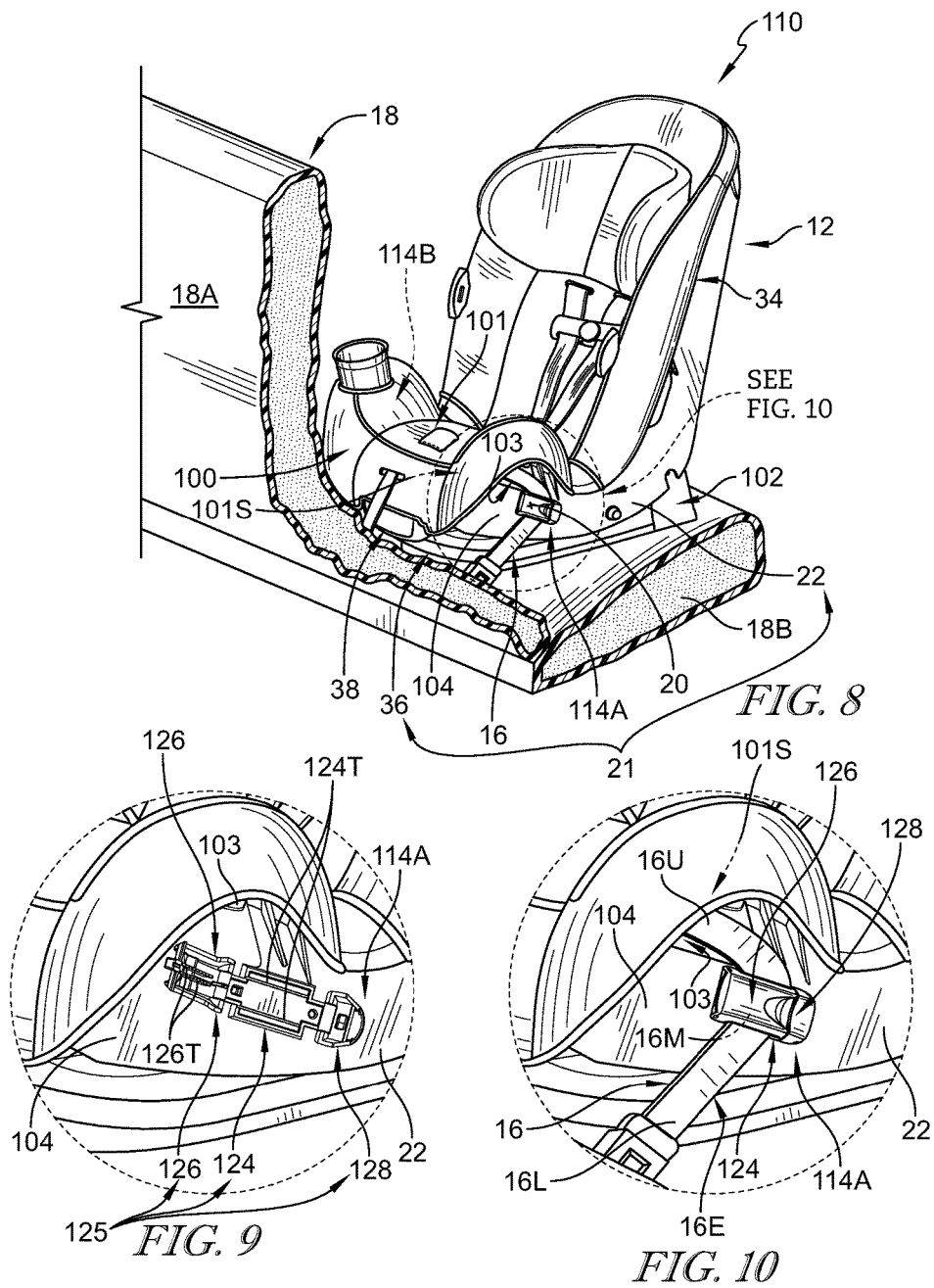

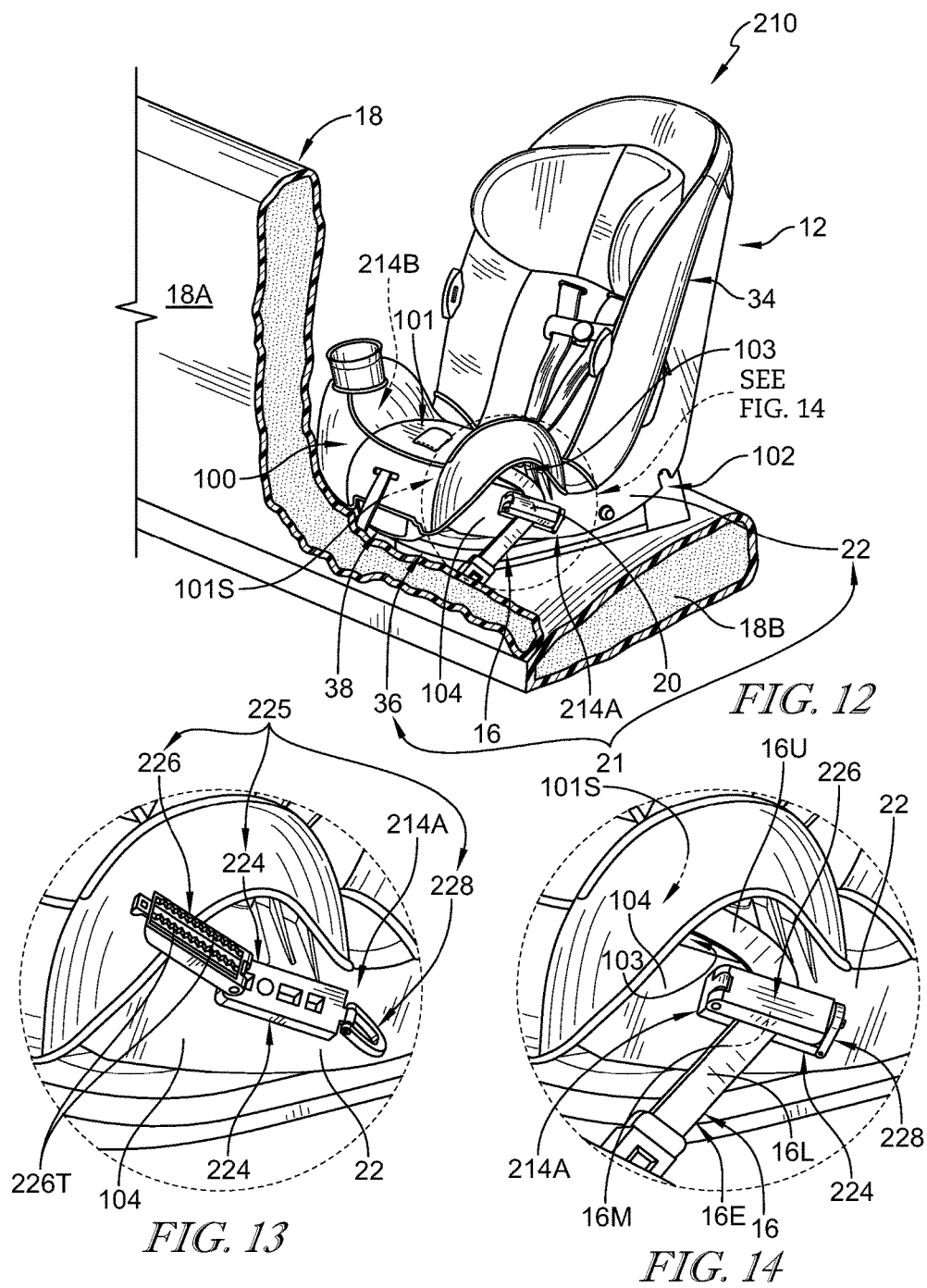

US 10,160,353 B2

BELT-GUIDE CLIP FOR A CHILD SEAT

PRIORITY CLAIM

This application claims priority under 35 U.S.C. § 119(e) to U.S. Provisional Application Ser. No. 62/248,729, filed Oct. 30, 2015, which is expressly incorporated by reference herein.

BACKGROUND

The present disclosure relates to a child restraint, and particularly to a child restraint coupled to a vehicle passenger seat of a vehicle. More particularly, the present disclosure relates to a child restraint coupled to a vehicle passenger seat by a lap belt included in the vehicle passenger seat.

SUMMARY

According to the present disclosure, a juvenile vehicle seat includes a seat bottom and a seat back. The seat back is coupled to the seat bottom and arranged to extend upwardly away from the seat bottom.

In illustrative embodiments, the juvenile vehicle seat further includes a belt-guide clip coupled to the seat bottom and arranged to lie in a fixed position relative to the seat bottom. The belt-guide clip is configured to provide means for locating minimizing rotation of the juvenile vehicle seat about an axis of rotation when the juvenile vehicle seat is in a rear-facing position relative to a vehicle passenger seat underlying the juvenile vehicle seat in response to application of an external force to the vehicle passenger seat so that transfer of a resultant force to an occupant of the seat is minimized during and after application of the external force the juvenile vehicle seat.

In illustrative embodiments, the belt-guide clip is coupled to the seat bottom and configured to receive a portion of a vehicle lap belt therein to anchor the seat bottom in an installed position. Placement of the belt-guide clip midway between a front and rear portions of the seat bottom functions to establish a modified axis of rotation of the seat bottom during rebound movement of the seat bottom toward a seat back of a vehicle passenger seat following exposure of the vehicle passenger seat to an external impact.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a child restraint including a first embodiment of a belt-guide clip in accordance with the present disclosure showing the belt-guide clip coupled to a juvenile vehicle seat included in the child restraint and that a lap belt included in a vehicle passenger seat underlying the juvenile vehicle seat couples the juvenile vehicle seat to the vehicle passenger seat and the belt-guide clip engages with the lap belt to cause rotation of the juvenile vehicle seat about a modified axis of rotation to be minimized during a rear-facing rebound event that occurs as part of a front impact event to the vehicle;

FIG. 2 is an enlarged view of a portion of FIG. 1 showing the belt-guide clip coupled to a first side of a seat bottom included in the juvenile vehicle seat, the lap belt included in the vehicle passenger seat arranged to extend upwardly through the belt-guide clip and through a portion of the seat bottom, and suggesting that engagement of the lap belt by the belt-guide clip alters the lap belt routing to cause the modified axis of rotation to be established during the impact event;

FIG. 3 is an enlarged exploded assembly view of the belt-guide clip included in the child restraint of FIG. 1 showing that the belt-guide clip includes first and second retainer tabs arranged to receive fasteners to couple the belt-guide clip to the seat bottom of the juvenile vehicle seat, first and second support rails extending between the first and second retainer tabs to form a guide slot therebetween, and a cantilevered belt-retainer arm extending from the first retainer tab toward the second retainer tab and suggesting that the belt-guide clip is configured to receive the lap belt between the belt-retainer arm and the first and second support rails to retain the lap belt relative to the juvenile vehicle seat so that the modified axis of rotation is established during the impact event;

FIG. 4 is an exploded assembly view of the child restraint of FIG. 1 showing that the child restraint includes a juvenile vehicle seat having a seat bottom, a seat back extending upwardly from the seat bottom, and first and second belt-guide clips coupled to opposite sides of the seat bottom, a seat support underlying the juvenile vehicle seat, and a seat lock configured to vary a tilt angle of the juvenile vehicle seat relative to the seat support;

FIGS. 5 through 7 are a series of views showing movement of the child restraint in response to application of an external force from an impact event to the child restraint of FIGS. 1 and 4 and suggesting that the belt-guide clips are configured to minimize rebounding movement of the child restraint;

FIG. 5 is a side elevation view of the child restraint of FIGS. 1 and 4 installed on a vehicle passenger seat in a rear-facing position in which a child seated in the child restraint faces a seat back of the vehicle passenger seat and suggesting that an external force applied to the vehicle passenger seat as a result of an impact event causes the child restraint to first pivot in a first direction (double phantom arrow) away from the seat back of the vehicle passenger seat;

FIG. 6 a view similar to FIG. 5 showing that the child restraint has rotated in the first direction away from the seat back of the vehicle passenger seat in response to an impact event and suggesting that the child restraint is about to rebound and rotate about the modified axis of rotation in a second direction (double phantom arrow) toward the seat back as suggested in FIG. 7;

FIG. 7 a view similar to FIG. 6 showing that the child restraint has rotated in the second direction toward the seat back of the vehicle passenger seat during the rear-facing rebound portion of the impact event and showing that rotation is limited due to the belt-guide clip establishing the modified axis of rotation;

FIG. 8 is a perspective view of a child restraint including a second embodiment of a belt-guide clip in accordance with the present disclosure showing the belt-guide clip coupled to the seat bottom of the juvenile vehicle seat and a lap belt included in the vehicle passenger seat arranged to extend through and be retained by the belt-guide clip to cause a modified axis of rotation to be established during an impact event so that a rotation during a rear-facing rebound portion of the impact event is minimized;

FIG. 9 is an enlarged partial perspective view of the child restraint of FIG. 8 showing the belt-guide clip in an opened position in which the belt-guide clip is arranged to receive a portion of the lap belt therein;

FIG. 10 is an enlarged view of a portion of FIG. 8 showing the belt-guide clip in a closed position in which the belt-guide clip is coupled to the lap belt to retain the lap belt and establish the modified axis of rotation of the child restraint;

Figure 11:
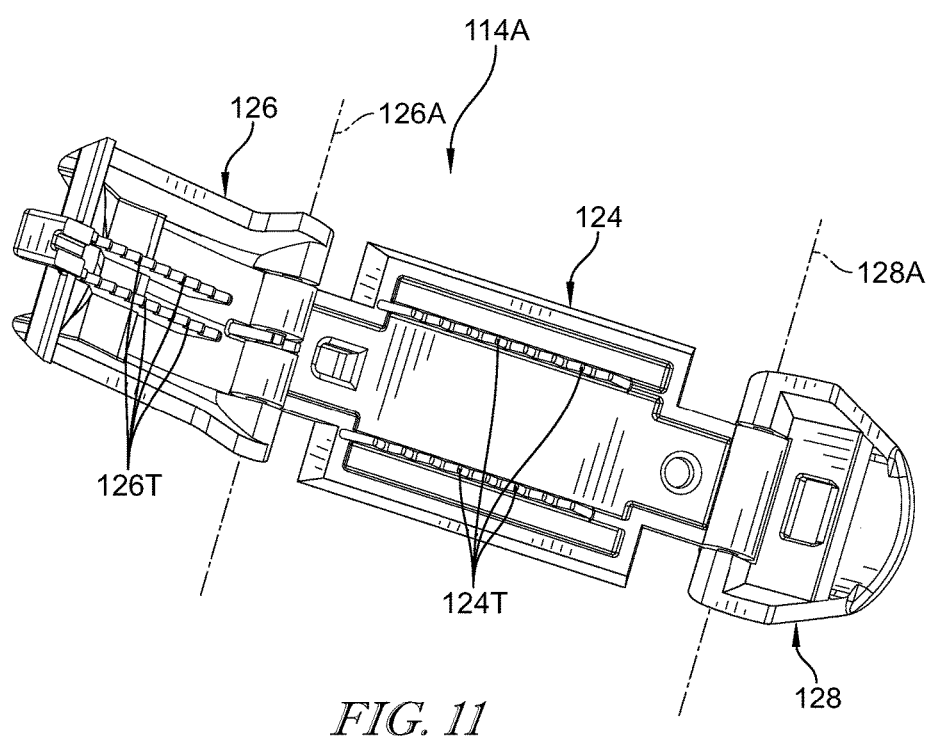
Figure 15:
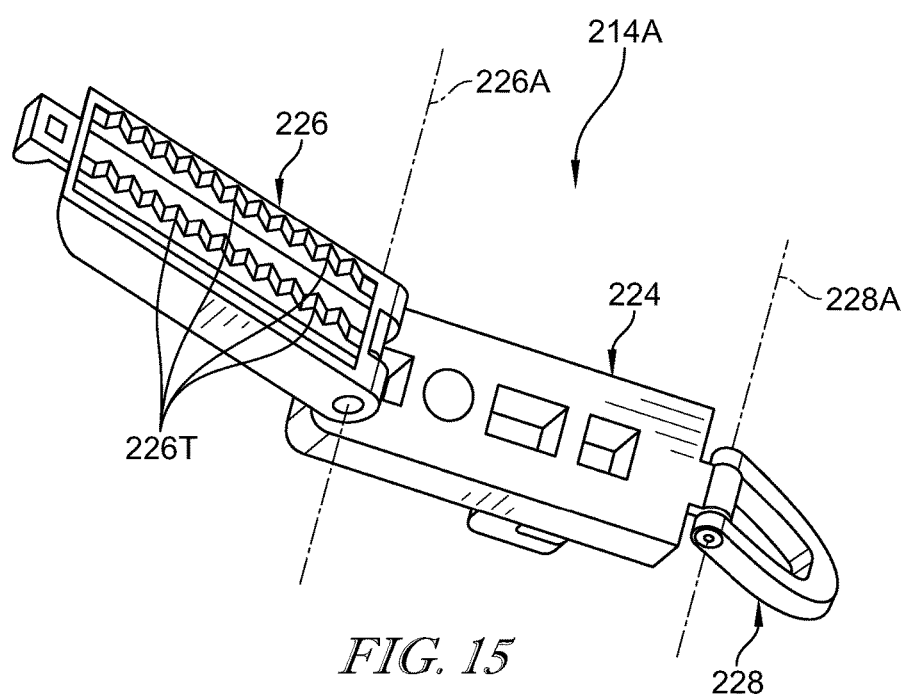

FIG. 11 is an enlarged perspective view of the belt-guide clip of FIG. 8 showing that the belt-guide clip includes a back clamp arranged to couple the belt-guide clip to the seat bottom of the juvenile seat and including teeth configured to engage a back side of the lap belt, a front clamp coupled to a first end of the back clamp to pivot relative to the back clamp and including teeth configured to engage a front side of the safety belt, and a latch coupled to a second end of the back clamp to pivot relative to the back claim and configured to engage the front clamp to block relative movement between the front and back clamps when the belt-guide clip is in the closed position so that the lap belt is remains engaged with the belt-guide clip;

FIG. 12 is a perspective view of a child restraint including a third embodiment of a belt-guide clip in accordance with the present disclosure showing the belt-guide clip coupled to the seat bottom of the juvenile vehicle seat and a lap belt included in the vehicle passenger seat arranged to extend through and be retained by the belt-guide clip to cause a modified axis of rotation to be established during an impact event so that a rotation during a rear-facing rebound portion of the impact event is minimized;

FIG. 13 is an enlarged partial perspective view of the child restraint of FIG. 12 showing the belt-guide clip in an opened position in which the belt-guide clip is arranged to receive a portion of the lap belt therein;

FIG. 14 is an enlarged view of a portion of FIG. 12 showing the belt-guide clip in a closed position in which the belt-guide clip is coupled to the lap belt to retain the lap belt and establish the modified axis of rotation of the child restraint; and FIG. 15 is an enlarged perspective view of the belt-guide clip of FIG. 12 showing that the belt-guide clip includes a back clamp arranged to couple the belt-guide clip to the seat bottom of the juvenile seat and configured to engage a back side of the safety belt, a front clamp coupled to a first end of the back clamp to pivot relative to the back clamp and including teeth configured to engage a front side of the safety belt, and a latch coupled to a second end of the back clamp to pivot relative to the back clamp and configured to engage the front clamp to block relative movement between the front and back clamps when the belt-guide clip is in the closed position so that the lap belt is remains engaged with the belt-guide clip.

DETAILED DESCRIPTION

Figure 5:
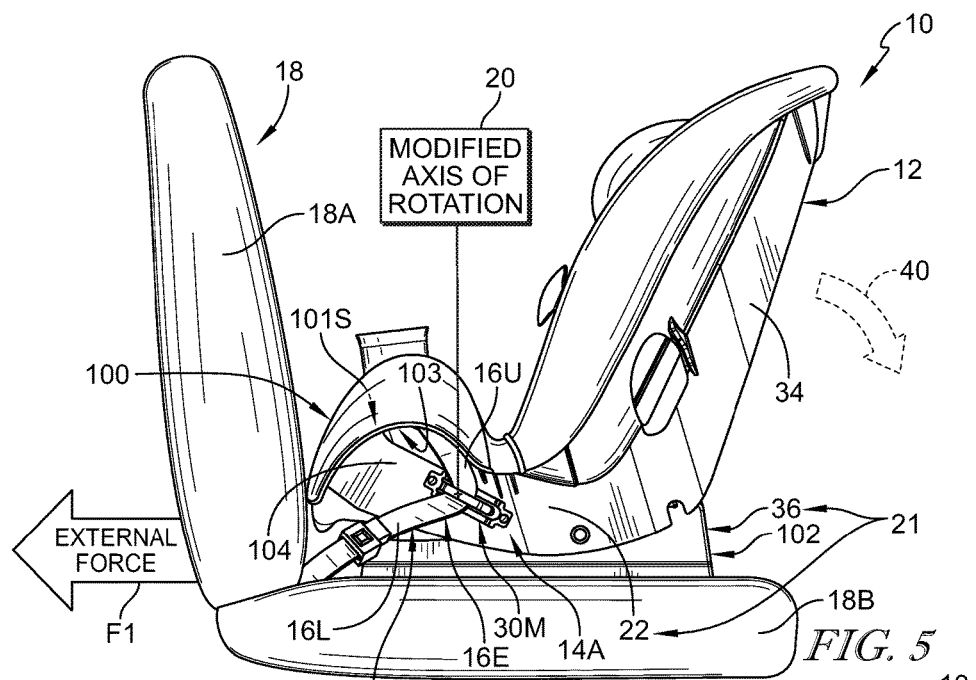
Figure 6:
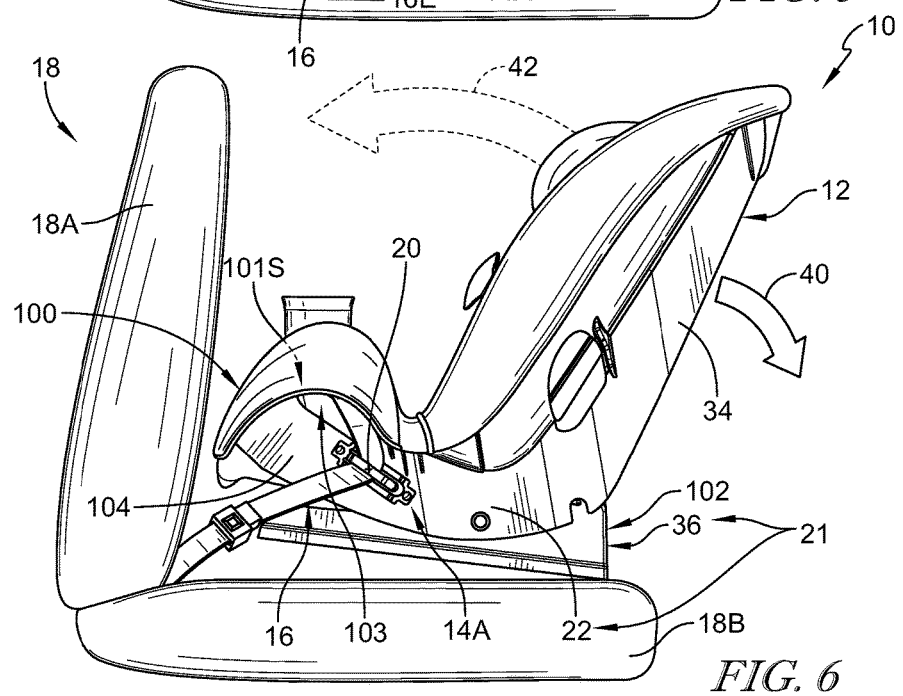
Figure 7:
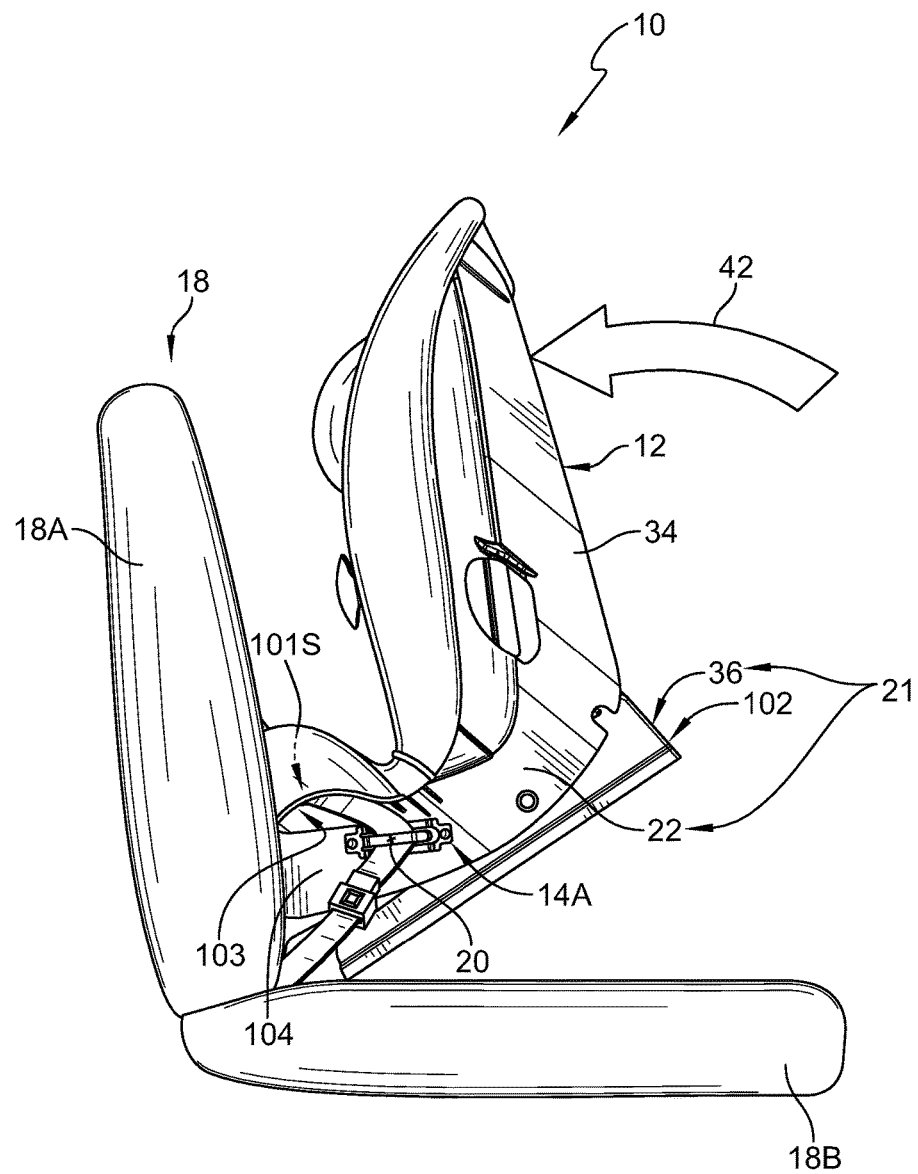

A child restraint 10 in accordance with the present disclosure includes a juvenile seat 12 and belt-guide clip 14A, 14B as shown in FIGS. 1-4. Belt-guide clip 114A is coupled to juvenile seat 12 to engage a lap belt 16 and is configured provide means for establishing a modified axis of rotation 20 about which child restraint 10 rotates about toward a vehicle passenger seat 18 during a rebound portion of an impact event as shown in FIGS. 5-7. A second embodiment of a belt-guide clip 114 in accordance with the present disclosure is shown in FIGS. 8-11. A third embodiment of a belt-guide clip 214 in accordance with the present disclosure is shown in FIGS. 12-15.

Child restraint 10 is support by vehicle passenger seat 18 in a rear-facing orientation as shown in FIG. 1. A child (not shown) restrained by child restraint 10 faces toward a seat back 18A included in vehicle passenger seat 18 when child restraint 10 is in the rear-facing orientation. Lap belt 16 included in vehicle passenger seat 18 interconnects child restraint 10 to a seat bottom 18B included in vehicle passenger seat 18 as shown in FIG. 1. During an impact event (e.g., a front impact to the vehicle), child restraint 10 in the rear-facing orientation first moves away from seat back 18A and shown in FIGS. 5 and 6 and then rebounds and moves in a direction back toward seat back 18B as shown in FIG. 7. Belt-guide clips 14A, 14B of child restraint 10 cooperate with lap belt 16 to limit rebounding movement of child restraint 10 back toward seat back 18B.

Figure 4:
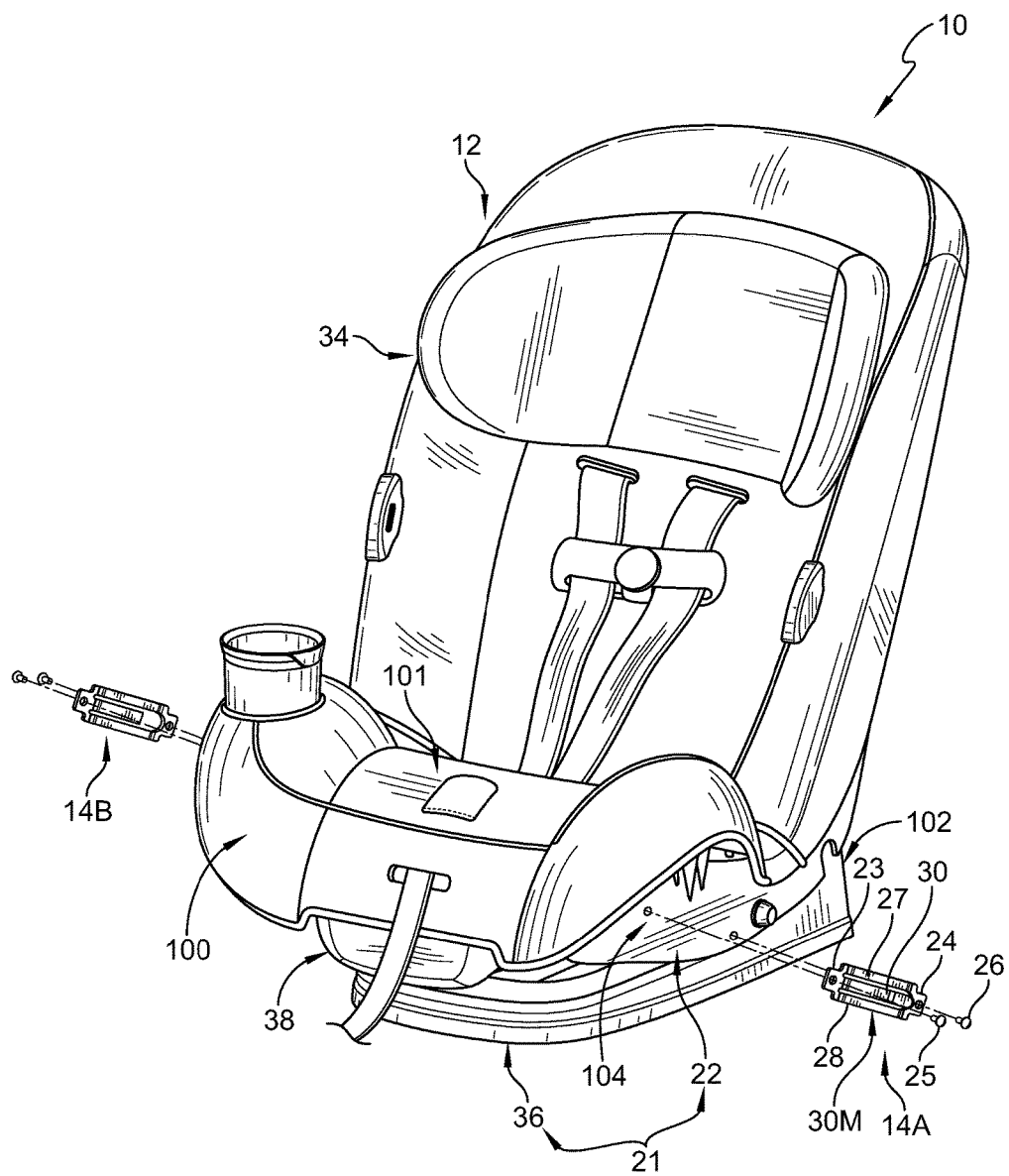

Child restraint 10 includes juvenile seat 12 and first and second belt-guide clips 14A, 14B as shown in FIG. 4. One belt-guide clip 14A is coupled to a first side of a seat bottom 22 included in juvenile seat 12 and the other belt-guide clip 14B is coupled to an opposite second side of seat bottom 22 as suggested in FIG. 4. Lap belt 16 is routed upwardly from vehicle passenger seat 18, through first belt-guide clip 14A, through seat bottom 22, through second belt-guide clip 14B, and back to vehicle passenger seat 18. While only lap belt 16 is shown, any other suitable passenger belt or belts may be used.

During the impact event, an external force F1 is applied to the vehicle and transferred to child restraint 10 as suggested in FIG. 5. Belt-guide clips 14A, 14B engage lap belt 16 and cooperate with lap belt 16 to modify movement of child restraint 10 in response to application of external force F1. Movement is modified as a result of belt-guide clips 14A, 14B engaging lap belt 16 to cause rotation of child restraint 10 about modified axis of rotation 20 to be minimized during a rear-facing rebound portion of the impact.

Second belt-guide clip 14B is substantially the same as first belt-guide clip 14A and the description of first belt-guide clip 14A applicable to second belt-guide clip 14B. First belt-guide clip 14A includes first and second retainer tabs 23, 24, fasteners 25, 26, first and second support rails 27, 28, and a cantilevered belt-retainer arm 30 as shown in FIG. 3. First and second retainer tabs 23, 24 are arranged to receive associated fasteners 25, 26 therein to couple belt-guide clip 14A to seat bottom 22 of juvenile vehicle seat 12. First and second support rails 27, 28 are arranged to extend between first and second retainer tabs 23, 24 to form a guide slot 32 therebetween as shown in FIG. 3. Cantilevered belt-retainer arm 30 is arranged to extend from first retainer tab 23 toward second retainer tab 24. Belt-guide clip 14A is configured to receive lap belt 16 between belt-retainer arm 30 and first and second support rails 27, 28 to retain lap belt 16 relative to juvenile vehicle seat 12 so that modified axis of rotation 20 is established during the impact event.

Juvenile seat 12 includes seat bottom 22, a seat back 34, a seat support 36, and a seat lock 38 as shown in FIG. 4. Seat back 34 is arranged to extend upwardly from seat bottom 22. First and second belt-guide clips 14A, 14B are coupled to opposite sides of seat bottom 22. Seat support 36 is arranged to underlie seat bottom 22. Seat lock 38 is configured to vary a tilt angle of juvenile seat 12 relative to seat support 36.

Child restraint 10 moves as suggested in FIGS. 5-7 in response to application of external force F1 from an impact event. Belt-clip guides 14A, 14B are configured to minimize rebounding movement of the child restraint 10 as shown in FIG. 7.

Child restraint 10 is installed on vehicle passenger seat 18 in the rear-facing position in which a child (not shown) seated in child restraint 10 faces toward seat back 18B of vehicle passenger seat 18. Application of external force F1 to vehicle passenger seat 18 and child restraint 10 causes child restraint 10 to first pivot in a first direction 40 (double phantom arrow) away from seat back 18B of vehicle passenger seat 18 as shown in FIG. 5. After child restraint 10 has rotated in first direction 40 away from seat back 18B of vehicle passenger seat 18 in response to application of external force F1, child restraint 10 rebounds by rotating about modified axis of rotation 20 in a second direction 42 (double phantom arrow) toward seat back 18B as shown in FIGS. 6 and 7. Rotation of child restraint 10 in second direction 42 is limited by belt-guide clips 14A, 14B establishing modified axis of rotation 20.

A child restraint 110 in accordance with another embodiment of the present disclosure includes juvenile seat 12 and first and second belt-guide clips 114A, 114B as shown in FIG. 8. One belt-guide clip 114A is coupled to a first side of a seat bottom 22 included in juvenile seat 12 and the other belt-guide clip 114B is coupled to an opposite second side of seat bottom 22 as suggested in FIG. 8. Lap belt 16 is routed upwardly from vehicle passenger seat 18, through first belt-guide clip 114A, through seat bottom 22, through second belt-guide clip 114B, and back to vehicle passenger seat 18.

During the impact event, an external force F1 is applied to the vehicle and transferred to child restraint 110. Belt-guide clips 114A, 114B engage lap belt 16 and cooperate with lap belt 16 to modify movement of child restraint 110 in response to application of external force F1. Movement is modified as a result of belt-guide clips 114A, 114B engaging lap belt 16 to cause rotation of child restraint 110 about modified axis of rotation 20 to be minimized during a rear-facing rebound portion of the impact.

Second belt-guide clip 114B is substantially the same as first belt-guide clip 114A and the description of first belt-guide clip 114A is applicable to second belt-guide clip 114B. First belt-guide clip 114A includes a back clamp 124, a front clamp 126, and a latch 128 as shown in FIGS. 9-11. Back clamp 124 is arranged to couple belt-guide clip 114B to seat bottom 22 of juvenile seat 12 and includes teeth 124T configured to engage a back side of lap belt 16. Front clamp 126 is coupled to a first end of back clamp 124 to pivot relative to the back clamp 124 and includes teeth 126T configured to engage a front side of the lap belt 16. Latch 128 is coupled to a second end of back clamp 124 to pivot relative to back clamp 124 and configured to engage front clamp 126 to block relative movement between front and back clamps 124, 126 when belt-guide clip 114A is in a closed position so that lap belt 16 remains engaged with belt-guide clip 114A.

Belt-guide clip 114A is movable between an opened position as shown in FIGS. 9 and 11 and a closed position as shown in FIGS. 8 and 10. Lap belt 16 may be installed in belt-guide clip 114A between front and back clamps 124, 126 when belt-guide clip 114A is in the opened position. When belt-guide clip 114A is in the closed position, lap belt 16 remains engaged with belt-guide clip 114A between front and back clamps 124, 126. Belt-guide clip 114A is configured to receive lap belt 16 between front and back clamps 124, 126 to retain lap belt 16 relative to juvenile vehicle seat 12 so that modified axis of rotation 20 is established during the impact event.

A child restraint 210 in accordance with another embodiment of the present disclosure includes juvenile seat 12 and first and second belt-guide clips 214A, 214B as shown in FIG. 12. One belt-guide clip 214A is coupled to a first side of a seat bottom 22 included in juvenile seat 12 and the other belt-guide clip 214B is coupled to an opposite second side of seat bottom 22 as suggested in FIG. 12. Lap belt 16 is routed upwardly from vehicle passenger seat 18, through first belt-guide clip 214A, through seat bottom 22, through second belt-guide clip 214B, and back to vehicle passenger seat 18.

During the impact event, an external force F1 is applied to the vehicle and transferred to child restraint 210. Belt-guide clips 214A, 214B engage lap belt 16 and cooperate with lap belt 16 to modify movement of child restraint 210 in response to application of external force F1. Movement is modified as a result of belt-guide clips 214A, 214B engaging lap belt 16 to cause rotation of child restraint 210 about modified axis of rotation 20 to be minimized during a rear-facing rebound portion of the impact.

Second belt-guide clip 214B is substantially the same as first belt-guide clip 214A and the description of first belt-guide clip 214A is applicable to second belt-guide clip 214B. First belt-guide clip 214A includes a back clamp 224, a front clamp 226, and a latch 228 as shown in FIGS. 12-15. Back clamp 224 is arranged to couple belt-guide clip 214B to seat bottom 22 of juvenile seat 12. Front clamp 226 is coupled to a first end of back clamp 224 to pivot relative to the back clamp 224 and includes teeth 226T configured to engage a front side of the lap belt 16. Latch 228 is coupled to a second end of back clamp 224 to pivot relative to back clamp 224 and configured to engage front clamp 226 to block relative movement between front and back clamps 224, 226 when belt-guide clip 214A is in a closed position so that lap belt 16 remains engaged with belt-guide clip 214A.

Belt-guide clip 214A is movable between an opened position as shown in FIGS. 13 and 15 and a closed position as shown in FIGS. 12 and 14. Lap belt 216 may be installed in belt-guide clip 214A between front and back clamps 224, 226 when belt-guide clip 214A is in the opened position. When belt-guide clip 214A is in the closed position, lap belt 16 remains engaged with belt-guide clip 214A between front and back clamps 224, 226. Belt-guide clip 214A is configured to receive lap belt 16 between front and back clamps 224, 226 to retain lap belt 16 relative to juvenile vehicle seat 12 so that modified axis of rotation 20 is established during the impact event.

A child restraint 10 includes a juvenile vehicle seat 12, a seat-anchor belt 16, and a belt-guide clip 14A, 14B as suggested in FIG. 1. Child restraint 10 is shown in FIGS. 1-7. A child restraint 110 is shown in FIGS. 8-11 and suggests the use of belt-guide clips 114A, 114B on juvenile vehicle seat 12 instead of belt-guide clips 14A, 14B. A child restraint 210 is shown in FIGS. 12-15 and suggests the use of belt-guide clips 224A, 224B.

Juvenile vehicle seat 12 includes a seat base on juvenile vehicle seat 12, 21 adapted to be set on an underlying seat bench 18B of a vehicle passenger seat 18 and a seat back 34 arranged to extend upwardly away from seat base 21 as suggested in FIGS. 1, 8, and 12. In illustrative embodiments, seat base 21 comprises seat bottom 22 and seat support 26 as suggested in FIGS. 1 and 4.

Seat base 21 includes a back end 102 coupled to seat back 34, a front end 100 arranged to lie in a spaced-apart relation to back end 102, a seat pad 101 arranged to extend between front and back ends 100, 102 of seat base 21 to support buttocks of an occupant of juvenile vehicle seat 12, and a side wall 104 arranged to extend between front and back ends 100, 102 of seat base 21 as shown in FIGS. 1, 8, and 12. Side wall 104 is configured to cooperate with seat pad 101 to form a belt-discharge opening 103 therebetween as shown in FIGS. 1 and 2. Belt-discharge opening 103 is formed to lie at a first distance above the underlying seat bench 18B when juvenile vehicle seat 12 is retained in a rearward-facing position on the underlying seat bench 18B as suggested in FIG. 5. In such a rearward facing position, seat base 21 sets on the underlying seat bench 18B to cause front end 100 of seat base 21 to lie in closely confronting relation to an upright seat back 18A of vehicle passenger seat 18 and cause seat back 34 of juvenile vehicle seat 12 to lie in spaced-apart relation to the upright seat back 18A of vehicle passenger seat 18 to locate seat pad 101 of seat base 21 therebetween.

Seat-anchor belt 16 is arranged to extend under seat pad 101 of seat base 21 through a belt-receiver space 101S formed under seat pad 101 as suggested in FIGS. 1, 2, and 5-7. Seat-anchor belt 16 is also arranged to exit belt-receiver space 101S through the belt-discharge opening 103 formed between seat pad 101 and side wall 104 of seat base 21 to cause an exposed portion 16E of seat-anchor belt 16 to extend downwardly from the belt-discharge opening 103 along an exterior surface of side wall 104 of seat base 21 in a direction toward the underlying seat bench 18B as suggested in FIGS. 2 and 5.

Belt-guide clip 14A is coupled to side wall 104 of seat base 21 to lie in a position below the belt-discharge opening 103 and at a lesser second distance above the underlying seat bench 18B as shown in FIGS. 1 and 2. Belt-guide clip 14A is arranged to lie at a lesser second distance above the underlying seat bench 18B when juvenile vehicle seat 12 is retained in a rearward-facing position on the underlying seat bench 18B as suggested in FIG. 5. Belt-guide clip 14A is arranged to engage a medial section 16M of the exposed portion 16E of seat-anchor belt 16 at a point below the belt-discharge opening 103 as suggested in FIGS. 1, 2, and 5 to establish a horizontal modified axis of rotation 20 of juvenile vehicle seat 12 that is below the belt-discharge opening 103 during exposure of juvenile vehicle seat 12 to a rearwardly directed external force F1 when juvenile vehicle seat 12 is retained by seat-anchor belt 16 in a substantially stationary state in the rearward-facing position on the underlying seat bench 18B.

The exposed portion 16E of seat-anchor belt 16 further includes an upper section 16U and a lower section 16L as shown in FIGS. 1 and 2. Upper section 16U is coupled to medial section 16M and arranged to extend from the belt-discharge opening 103 to belt-guide clip 14A as shown in FIG. 5. Lower section 16L is coupled to medial section 16M to locate medial section 16M between the upper and lower sections 16U, 16L as shown in FIG. 2. Lower section 16L is arranged to extend from belt-guide clip 14A toward the underlying seat bench 18B as shown in FIG. 5.

Belt-guide clip 14A is illustrated in FIGS. 1-7. Belt-guide clip 14A includes an arm mount 30M and a belt-retainer arm 30 as shown in FIG. 3. Arm mount 30M is fixed in a stationary position on the exterior surface of side wall 104 of seat base 21 as suggested in FIGS. 4 and 5. Belt-retainer arm 30 is cantilevered to arm mount 30M to define a belt-receiver passageway 16P therebetween as suggested in FIG. 3. Medial section 16M of seat-anchor belt 16 is located in belt-receiver passageway 16P as shown in FIG. 2. The modified axis of rotation 20 intercepts belt-receiver arm 30 of belt-guide clip 14A. Arm mount 30M comprises tabs 23, 24 and rails 22, 28 as suggested in FIG. 3.

Belt-guide clip 114A is illustrated in FIGS. 8-11. Belt-guide clip 114A includes a clamp 125 that is fixed in a stationary position on exterior surface of side wall 104 of seat base 21 as shown in FIGS. 8-10. Clamp 125 is configured to provide means for clamping the medial section 16M of the exposed portion 16E of seat-anchor belt 16 to block movement of medial section 16M of the seat-anchor belt 16 relative to the seat base 21 as shown in FIG. 10. The modified axis of rotation 20 intercepts clamp 125 as shown in FIG. 8.

Clamp 125 includes a back clamp 124 and a front clamp 126 as shown in FIGS. 9 and 10. Back clamp 124 is mounted on the exterior surface of side wall 104 of seat base 21 as shown in FIG. 9. Front clamp 126 is mounted on back clamp 124 for pivotable movement about a pivot axis 126A between a belt-clamping position trapping the medial section 16M between the back and front clamps 124, 126 and a belt-releasing position freeing the medial section 16M for removal from the clamp 125 as shown in FIGS. 9-11. The modified axis of rotation 20 intercepts back and front clamps 124, 126 when front clamp 126 occupies the belt-clamping position as shown in FIG. 8.

Clamp 125 also includes a latch 128 that is movable relative to back and front clamps 124, 126 as shown in FIGS. 9 and 10. Latch 128 is mounted for movement about a pivot axis 128A relative to back clamp 124 between a clamp-locking position engaging the front clamp 126 to block relative motion between the back and front clamps 124, 126 and a clamp-unlocking position disengaging the front clamp 126 to free the front clamp 126 to be moved from the belt-clamping position to the belt-releasing position as shown in FIGS. 9-11.

Belt-guide clip 214A is illustrated in FIGS. 12-15. Belt-guide clip 214A includes a clamp 225 that is fixed in a stationary position on exterior surface of side wall 104 of seat base 21 as shown in FIGS. 12-14. Clamp 225 is configured to provide means for clamping the medial section 16M of the exposed portion 16E of seat-anchor belt 16 to block movement of medial section 16M of the seat-anchor belt 16 relative to the seat base 21 as shown in FIG. 14. The modified axis of rotation 20 intercepts clamp 225 as shown in FIG. 12.

Clamp 225 includes a back clamp 224 and a front clamp 226 as shown in FIGS. 13 and 14. Back clamp 224 is mounted on the exterior surface of side wall 104 of seat base 21 as shown in FIG. 13. Front clamp 226 is mounted on back clamp 224 for pivotable movement about a pivot axis 226A between a belt-clamping position trapping the medial section 16M between the back and front clamps 224, 226 and a belt-releasing position freeing the medial section 16M for removal from the clamp 225 as shown in FIGS. 13-15. The modified axis of rotation 20 intercepts back and front clamps 224, 226 when front clamp 226 occupies the belt-clamping position as shown in FIG. 12.

Clamp 225 also includes a latch 228 that is movable relative to back and front clamps 224, 226 as shown in FIGS. 13 and 14. Latch 228 is mounted for movement about a pivot axis 228A relative to back clamp 224 between a clamp-locking position engaging the front clamp 226 to block relative motion between the back and front clamps 224, 226 and a clamp-unlocking position disengaging the front clamp 226 to free the front clamp 226 to be moved from the belt-clamping position to the belt-releasing position as shown in FIGS. 13-15.

The invention claimed is:
1. A child restraint comprising
   a juvenile vehicle seat including a seat bottom adapted to be set on an underlying seat bench included in a vehicle passenger seat and a seat back extending upwardly away from the seat bottom, the seat back having a bottom end coupled to the seat bottom and a top end spaced apart from the bottom end and a clip coupled to the seat bottom below a belt-discharge opening formed in the seat bottom configured to provide means for locating a horizontal modified axis of rotation of the juvenile vehicle seat such that rotation of the juvenile vehicle seat relative to the vehicle seat is minimized during a rebound event in which a child supported in the juvenile vehicle seat faces toward a seat back included in the vehicle passenger seat and the juvenile vehicle seat rotates about the horizontal modified axis of rotation relative to the vehicle seat so that the top end of the seat back of the juvenile vehicle seat rotates toward the seat back of the vehicle seat in response to an impact event in which a front impact force is applied to the vehicle seat and causes the juvenile vehicle seat to rotate about the horizontal modified axis of rotation relative to the vehicle seat so that the top end of the seat back of the juvenile vehicle seat rotates away from the seat back of the vehicle seat.

2. The child restraint of claim 1, wherein the horizontal modified axis of rotation is located above a lower surface of the seat bottom and between the lower surface and the seat back.

3. The child restraint of claim 2, wherein the horizontal modified axis of rotation is located in spaced-apart relation to and between a front edge and a rear edge of the seat bottom.

4. The child restraint of claim 3, wherein the horizontal modified axis of rotation is arranged to extend through the clip.

5. The child restraint of claim 1, wherein the clip includes a body coupled to the seat bottom in a fixed position relative to the seat bottom and a cantilevered belt-retainer arm coupled to the body to extend outwardly away from the body and the seat bottom and lie in cantilevered relation to the body to establish a belt-receiving passageway between the cantilevered belt-retainer arm and the body which is adapted to receive a lap belt configured to interconnect the child restraint to the underlying seat bench.

6. The child restraint of claim 5, wherein the clip further includes a first retainer tab coupled to the body to extend away from the body and a second retainer tab coupled to the body to locate the body between the first and second retainer tabs.

7. The child restraint of claim 6, wherein the clip further includes a first fastener arranged to interconnect the first retainer tab to the seat bottom and a second fastener arranged to interconnect the second retainer table the seat bottom.

8. The child restraint of claim 5, wherein the body includes a first support rail and a second support rail located in spaced-apart relation to the first support rail to define a guide slot formed in the body therein.

9. The child restraint of claim 8, wherein the cantilevered belt-retainer arm is located between the first and second support rails.

10. The child restraint of claim 9, wherein the horizontal modified axis of rotation is arranged to extend through the cantilevered belt-retainer arm.

11. The child restraint of claim 1, wherein the clip includes a back clamp coupled to the seat bottom in a fixed position relative to the seat bottom, a front clamp coupled to the back clamp to move relative to the back clamp, and a latch coupled to the back clamp to move relative to the back clamp and engage the front clamp to block selectively movement of the front clamp.

12. The child restraint of claim 11, wherein the front clamp pivots between a closed position adapted to trap a lap belt between the front clamp and the back clamp and an opened position in which the front clamp extends away from the back clamp and the latch.

13. The child restraint of claim 12, wherein the front clamp includes a plurality of teeth adapted to engage one side of the lap belt when the front clamp is in the closed position.

14. The child restraint of claim 13, wherein the horizontal modified axis of rotation is located in spaced-apart relation to and above a lower surface of the seat bottom between the lower surface and the seat back and between a front edge and a rear edge of the seat bottom.

15. The child restraint of claim 14, wherein the horizontal modified axis of rotation is arranged to extend through the clip.

16. The child restraint of claim 13, wherein the back clamp includes a plurality of teeth adapted to engage an opposite side of the lap belt when the front clamp is in the closed position.

17. The child-restraint of claim 16, wherein a belt-receiving passageway is formed between the front clamp and the back clamp when the front clamp is in the closed position.

18. The child restraint of claim 17, wherein the horizontal modified axis of rotation is located in spaced-apart relation to and between a front edge and a rear edge of the seat bottom.

19. The child restraint of claim 18, wherein the horizontal modified axis of rotation is located in spaced-apart relation to and above a lower surface of the seat bottom between the lower surface and the seat back.

20. The child restraint of claim 19, wherein the horizontal modified axis of rotation is arranged to extend through the front clamp when the front clamp is in the closed position.

21. A child restraint comprising
a juvenile vehicle seat including a seat base adapted to be set on an underlying seat bench of a vehicle passenger seat and a seat back arranged to extend upwardly away from the seat base, the seat base having a back end coupled to the seat back, a front end arranged to lie in a spaced-apart relation to the back end, a seat pad arranged to extend between the front and back ends of the seat base to support buttocks of an occupant of the juvenile vehicle seat, and a side wall arranged to extend between the front and back ends of the seat base, the side wall is configured to cooperate with the seat pad to form a belt-discharge opening therebetween, the belt-discharge opening is formed to lie at a first distance above the underlying seat bench when the juvenile vehicle seat is retained in a rearward-facing position on the underlying seat bench in which the seat bottom sets on the underlying seat bench to cause the front end of the seat base to lie in closely confronting relation to an upright seat back of the vehicle passenger seat and cause the seat back of the juvenile vehicle seat to lie in spaced-apart relation to the upright seat back of the vehicle passenger seat to locate the seat pad of the seat base therebetween,
a seat-anchor belt that is arranged to extend under the seat pad of the seat base through a belt-receiver space formed under the seat pad and exit the belt-receiver space through the belt-discharge opening formed between the seat pad and the side wall of the seat base to cause an exposed portion of the seat-anchor belt to extend downwardly from the belt-discharge opening along an exterior surface of the side wall of the seat base in a direction toward the underlying seat bench, and a belt-guide clip that is coupled to the side wall of the seat base to lie in a position below the belt-discharge opening and at a lesser second distance above the underlying seat bench, the belt-guide clip is arranged to engage a medial section of the exposed portion of the seat-anchor belt at a point below the belt-discharge opening to establish a horizontal modified axis of rotation of the juvenile vehicle seat that is below the belt-discharge opening during exposure of the juvenile vehicle seat to a rearwardly directed external force.

22. The child restraint of claim 21, wherein the exposed portion of the seat-anchor belt further includes an upper section coupled to the medial section and arranged to extend from the belt-discharge opening to the belt-guide clip and a lower section coupled to the medial section to locate the medial section between the upper and lower sections and arranged to extend from the belt-guide clip toward the underlying seat bench.

23. The child restraint of claim 21, wherein the belt-guide clip includes an arm mount fixed in a stationary position on the exterior surface of the side wall of the seat base and a belt-retainer arm cantilevered to the arm mount to define a belt-receiver passageway therebetween and the medial section of the seat-anchor belt is located in the belt-receiver passageway.

24. The child restraint of claim 23, wherein the modified axis of rotation intercepts the belt-receiver arm of the belt-guide clip.

25. The child restraint of claim 21, wherein the belt-guide clip includes a clamp fixed in a stationary position on the exterior surface of the side wall of the seat base and the clamp is configured to provide means for clamping the medial section of the exposed portion of the seat-anchor belt to block movement of the medial section of the seat-anchor belt relative to the seat base.

26. The child restraint of claim 25, wherein the modified axis of rotation intercepts the clamp.

27. The child restraint of claim 25, wherein the clamp includes a back clamp mounted on the external surface of the side wall of the seat base and a front clamp mounted on the back clamp for pivotable movement about a pivot axis between a belt-clamping position trapping the medial section between the back and front clamps and a belt-releasing position freeing the medial section for removal from the clamp and the belt-guide clip further includes a latch mounted for movement relative to the back clamp between a clamp-locking position engaging the front clamp to block relative motion between the back and front clamps and a clamp-unlocking position disengaging the front clamp to free the front clamp to be moved from the belt-clamping position to the belt-releasing position.

28. The child restraint of claim 27, wherein the modified axis of rotation intercepts the back and front clamps when the front clamp occupies the belt-clamping position.

* * * * *